United States Patent
Augustinowicz

(10) Patent No.: US 8,698,630 B2
(45) Date of Patent: Apr. 15, 2014

(54) RFID REMOTE ANTENNA SECURITY SYSTEM

(75) Inventor: Walter P. Augustinowicz, Englewood, FL (US)

(73) Assignee: Identity Stronghold, LLC., Englewood, FL (US)

( * ) Notice: Subject to any disclaimer, the term of this patent is extended or adjusted under 35 U.S.C. 154(b) by 174 days.

(21) Appl. No.: 13/216,589

(22) Filed: Aug. 24, 2011

(65) Prior Publication Data

US 2013/0049963 A1 Feb. 28, 2013

(51) Int. Cl.
*G08B 13/14* (2006.01)

(52) U.S. Cl.
USPC .................................. 340/572.1; 455/41.3

(58) Field of Classification Search
USPC ................ 340/572.1; 235/379, 380, 487, 492
See application file for complete search history.

(56) References Cited

U.S. PATENT DOCUMENTS

| | | | |
|---|---|---|---|
| 6,634,564 B2 | 10/2003 | Kuramochi | |
| 6,659,356 B2 | 12/2003 | Kashima | |
| 7,137,563 B2 | 11/2006 | Shibamoto | |
| 7,319,398 B2 | 1/2008 | Marino | |
| 7,667,652 B2 | 2/2010 | Gevargiz | |
| 7,830,322 B1 | 11/2010 | Oliver | |
| 2005/0192053 A1 | 9/2005 | Kao | |
| 2006/0197213 A1 | 9/2006 | Lian | |
| 2008/0101273 A1* | 5/2008 | Everest | 370/315 |
| 2009/0159663 A1* | 6/2009 | Mullen et al. | 235/379 |
| 2009/0166421 A1 | 7/2009 | Finn | |
| 2009/0206994 A1 | 8/2009 | Lee | |
| 2010/0156607 A1 | 6/2010 | Lankes | |

* cited by examiner

*Primary Examiner* — Brian Zimmerman
*Assistant Examiner* — Bhavin M Patel
(74) *Attorney, Agent, or Firm* — Michael S. Neustel

(57) ABSTRACT

An RFID remote antenna security system for preventing unauthorized reading of RFID cards. The RFID remote antenna security system generally includes a remote unit that is attached to or near a conventional RFID reader. The remote unit includes at least one remote contact in communication with a remote antenna. A carrier member is provided that includes at least one contact and an RFID chip that is in communication with the at least one contact. When the contact of the carrier member is physically connected to the remote contact of the remote unit, the radio waves received by the remote antenna are communicated to the RFID chip and the RFID chip transmits radio waves including data from the remote antenna for reading by the RFID reader.

18 Claims, 6 Drawing Sheets

RFID REMOTE ANTENNA SECURITY SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to RFID cards and more specifically it relates to an RFID remote antenna security system for preventing unauthorized reading of RFID cards.

2. Description of the Related Art

Any discussion of the related art throughout the specification should in no way be considered as an admission that such related art is widely known or forms part of common general knowledge in the field.

Radio-frequency identification (RFID) technology utilizes radio waves to transfer data from an RFID chip to a reader. RFID technology is currently utilized to track various items such as inventory and assets. Recently, RFID technology is being utilized within carrier members such as credit cards to store and transfer sensitive data such as credit card data, personal data and the like.

There are three main types of RFID technology: active, semi-passive and passive. Active RFID chips utilize a battery to broadcast radio waves containing data. Semi-passive RFID chips utilize a smaller battery than active RFID chips to keep the RFID chip "awake" but still rely upon a reader to provide power for broadcasting radio waves. Passive RFID chips are completely reliant upon an external RFID reader to provide the power to broadcast radio waves containing the data. Active RFID chips can transmit radio waves that may be read at ranges of 300 feet or more. Passive RFID chips can transmit radio waves that may be read at ranges of 20 or more feet. Passive RFID chips are the most common RFID chip because of they are relatively inexpensive compared to active and semi-passive RFID chips.

Passive RFID chip systems have two main components: an RFID reader and an RFID chip. The RFID reader has a reader antenna that transmits radio waves that are received by an RFID antenna within the passive RFID chip. The radio waves received by the passive RFID chip are converted to electrical power and then used by the RFID chip to transmit radio waves containing data that are then detected by the RFID reader. The RFID reader then communicates the data received from the RFID chip via the radio waves to another device (e.g. computer) for processing.

Unfortunately, RFID chips, particularly passive RFID chips, are susceptible to unauthorized reading (a.k.a. "skimming") where an unauthorized RFID reader communicates with the RFID chip by merely being in close proximity to the RFID chip. Important data such as credit card data and personal data may be lost to unscrupulous individuals via the unauthorized reading of RFID cards such as RFID credit cards. To make matters worse, RFID chips do not need to be physically seen to transmit the data contained on the RFID chip.

Because of the inherent problems with the related art, there is a need for a new and improved RFID remote antenna security system for preventing unauthorized reading of RFID chips.

BRIEF SUMMARY OF THE INVENTION

The invention generally relates to an RFID card which includes a remote unit that is attached to or near a conventional RFID reader. The remote unit includes at least one remote contact in communication with a remote antenna. A carrier member is provided that includes at least one contact and an RFID chip that is in communication with the at least one contact. When the contact of the carrier member is physically connected to the remote contact of the remote unit, the radio waves received by the remote antenna are communicated to the RFID chip and the RFID chip transmits radio waves including data from the remote antenna for reading by the RFID reader.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
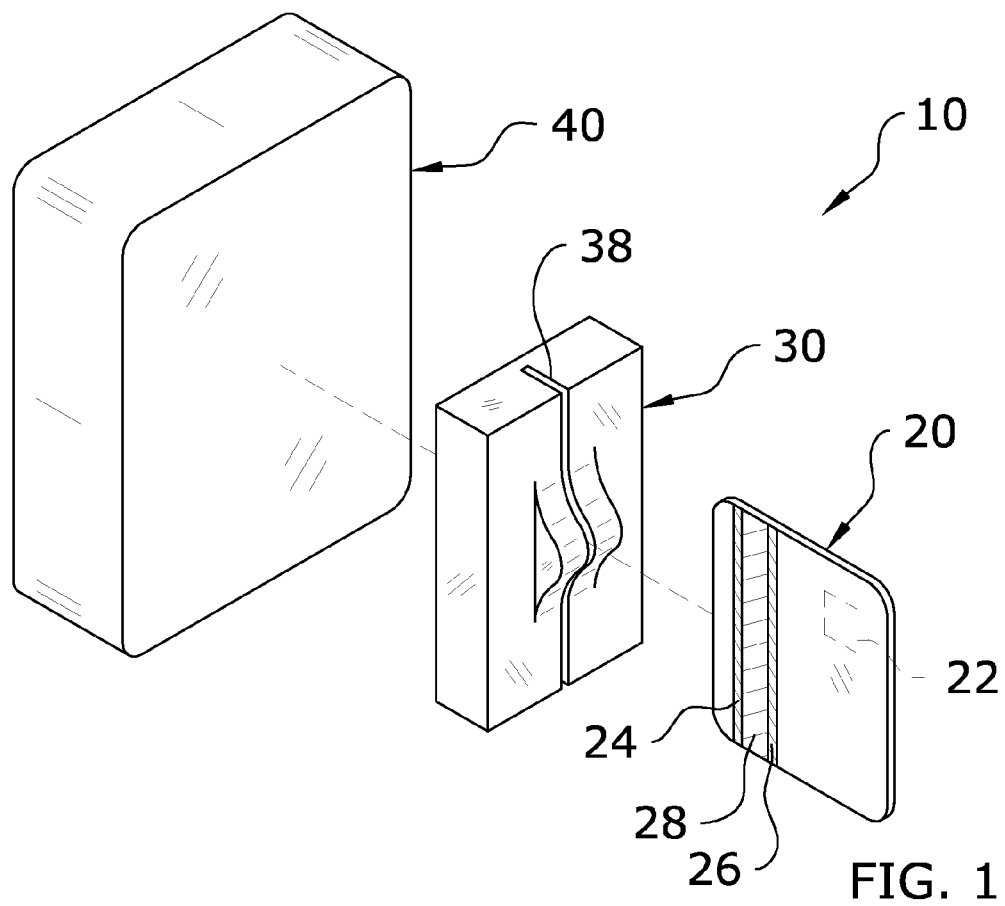
FIG. 1 is an exploded upper perspective view of the present invention.

A. Overview.

Turning now descriptively to the drawings, in which similar reference characters denote similar elements throughout the several views, FIGS. 1 through 6 illustrate a radio-frequency identification (RFID) remote antenna security system 10, which comprises a remote unit 30 that is attached to or near a conventional RFID reader 40. The remote unit 30 includes at least one remote contact in communication with a remote antenna 32. A carrier member 20 is provided that includes at least one contact and an RFID chip 22 that is in communication with the at least one contact. When the contact of the carrier member 20 is physically connected to the remote contact of the remote unit 30, the radio waves received by the remote antenna 32 are communicated to the RFID chip 22 and the RFID chip 22 transmits radio waves including data from the remote antenna 32 for reading by the RFID reader 40.

B. RFID Reader.

Figure 2:
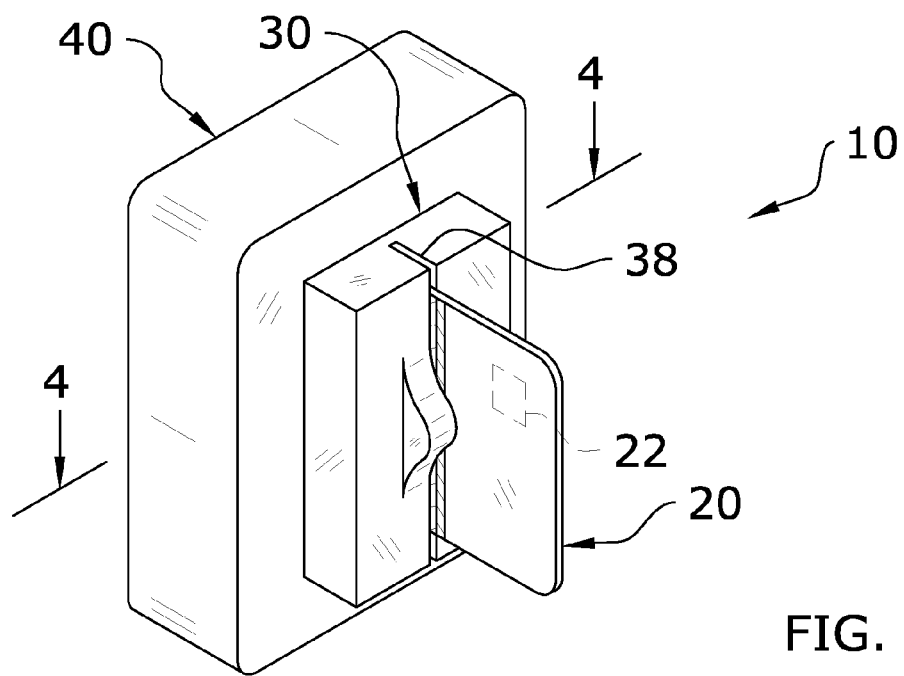
FIG. 2 is an upper perspective view of the present invention being utilized with the carrier member positioned within the remote unit to activate the RFID chip by electrically coupling the RFID chip to the remote antenna.

FIGS. 1 and 2 illustrate an exemplary RFID reader 40 which includes at least one reader antenna 42. The RFID reader 40 may be comprised of any reader device capable of transmitting and receiving radio waves relating to a passive, semi-passive or active RFID chip 22 system.

C. Remote Unit.

Figure 3A:
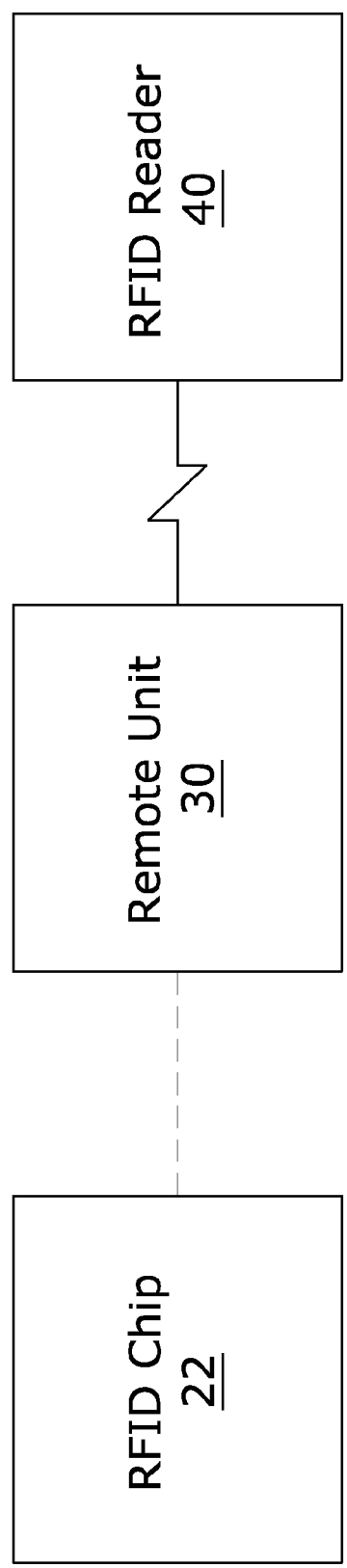
FIG. 3a is a block diagram illustrating the communication between the RFID chip, the remote antenna and the RFID reader.

A remote unit 30 is attached to or positioned near the RFID reader 40 as illustrated in FIGS. 1 through 3 of the drawings. The remote unit 30 may be attached to an existing or new RFID reader 40 via various attachment systems (e.g. adhesive, fasteners).

Figure 3B:
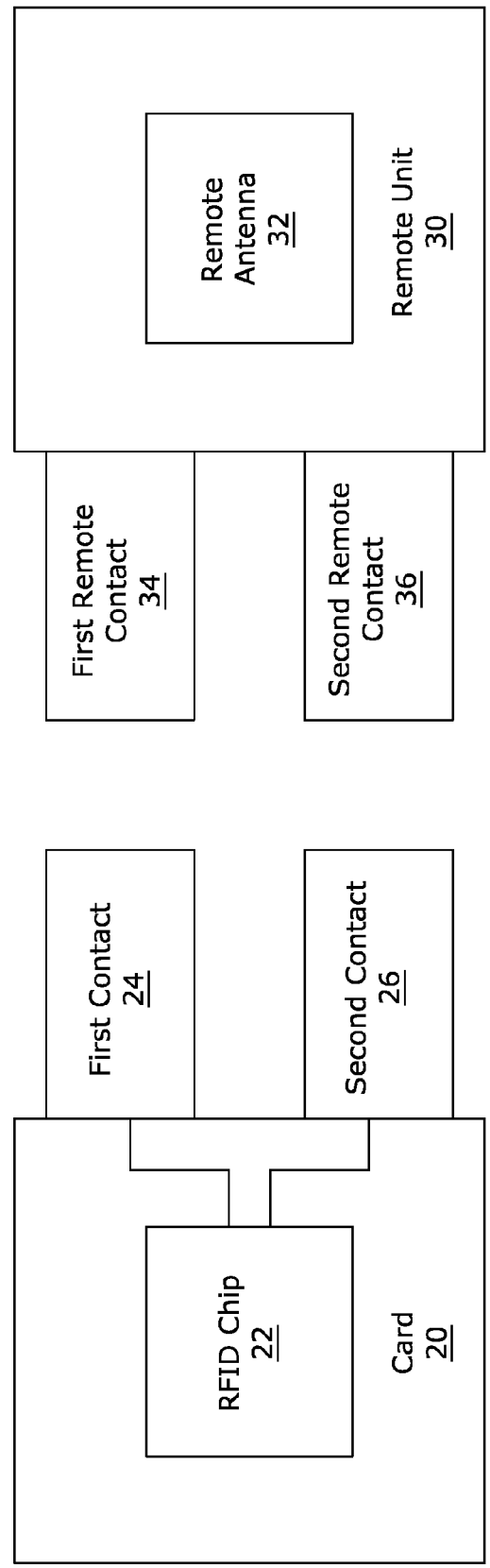
FIG. 3b is a block diagram illustrating the contacts of the carrier member separated from the contacts of the remote unit, thereby preventing the RFID chip from communicating with an RFID reader.
Figure 3C:
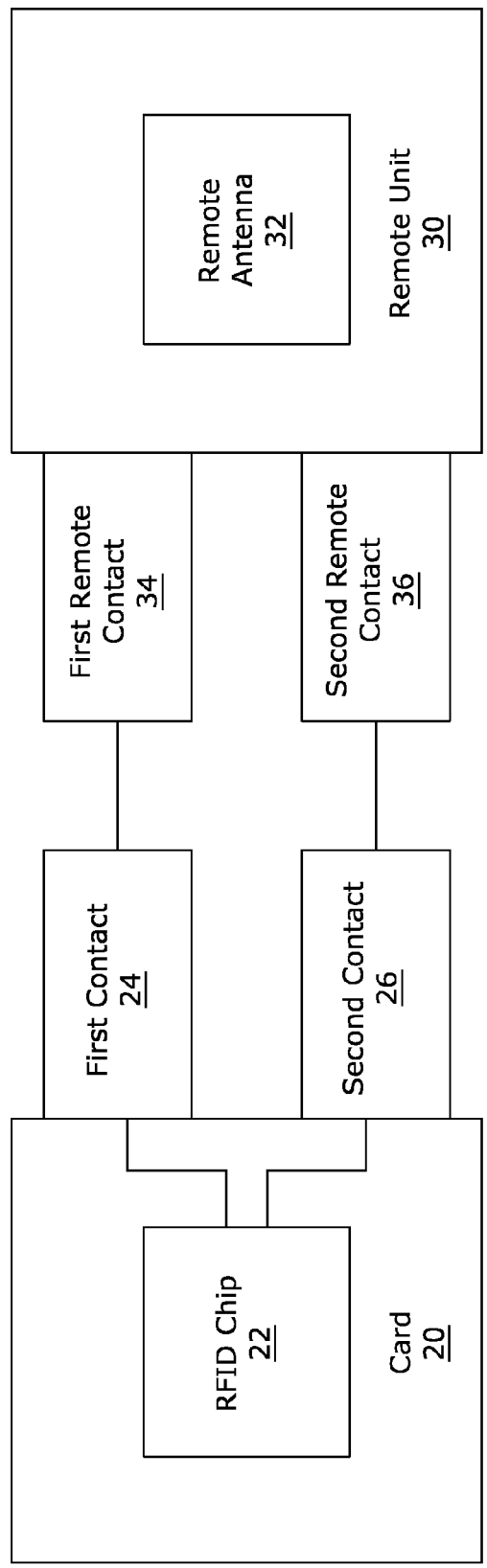
FIG. 3c is a block diagram illustrating the contacts of the carrier member in electrical communication with the contacts of the remote unit, thereby allowing the RFID chip to communicate with an RFID reader.
Figure 4:
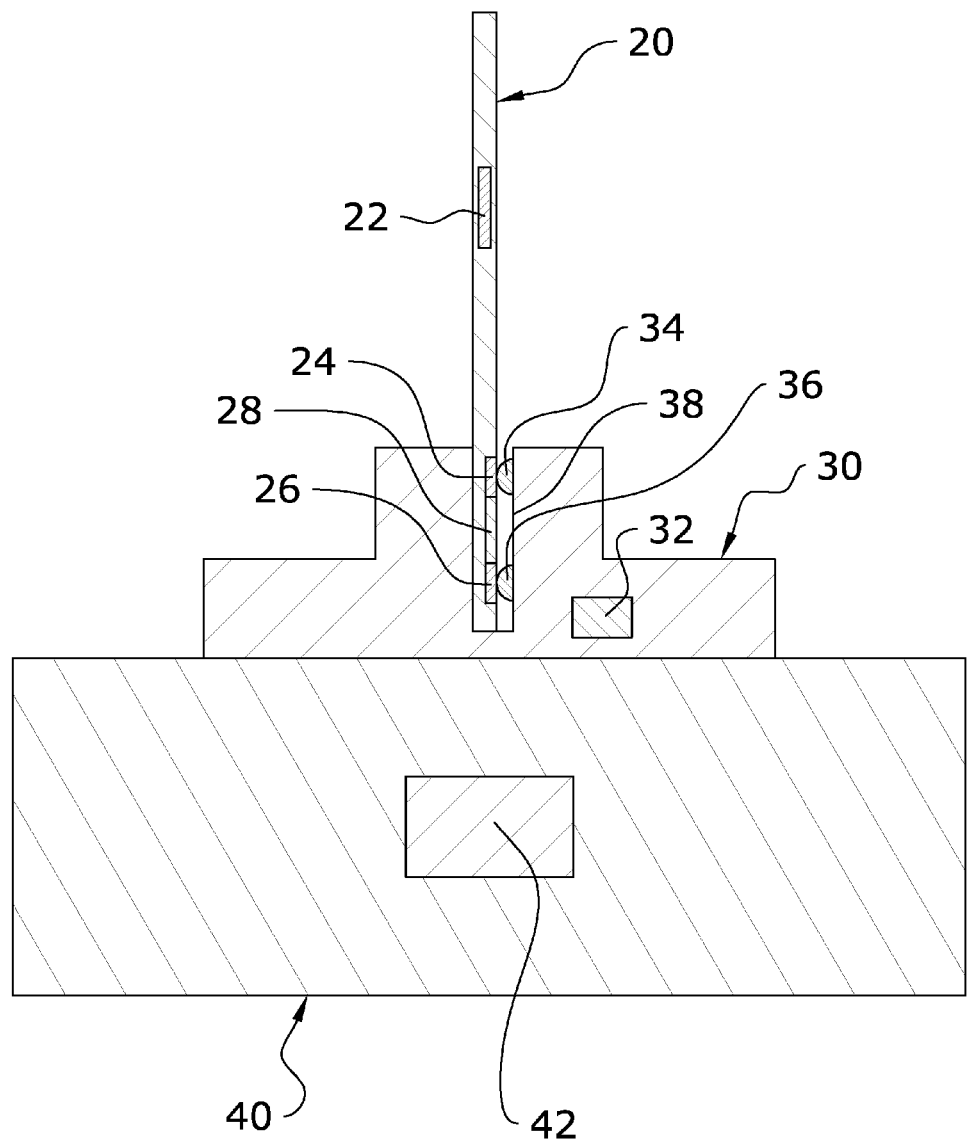
FIG. 4 is a cross sectional view taken along line 4-4 of FIG. 2 providing an exemplary embodiment with the carrier member positioned within a slot of the remote unit.

The remote unit 30 includes a remote antenna 32 as illustrated in FIGS. 3b, 3c and 4 of the drawings. The remote antenna 32 is comprised of an antenna capable of receiving and transmitting radio waves as used in a conventional RFID system. Since the RFID chip 22 within the carrier member 20 of the present invention preferably does not include an antenna for security reasons (e.g. prevent unauthorized skimming), the remote antenna 32 is utilized as a substitute and temporary antenna for the RFID chip 22 as discussed herein. The remote antenna 32 is in communication with the reader antenna 42 via radio waves as is known in the RFID industry.

The remote unit 30 includes at least one remote contact 34 in communication with the remote antenna 32. In particular, it is preferable that the remote unit 30 include a first remote contact 34 and a second remote contact 36, wherein the first remote contact 34 and the second remote contact 36 are electrically connected to the remote antenna 32 as illustrated in FIGS. 3b and 3c of the drawings. When the first remote contact 34 and the second remote contact 36 are electrically connected to the RFID chip 22 of the carrier member 20, the remote antenna 32 temporary becomes the antenna for the RFID chip 22 during the physical and electrical contact thereof.

The remote unit 30 preferably includes an opening 38 (e.g. a slot, aperture, passage, etc.) adapted to receive the carrier member 20 as shown in FIGS. 1, 2 and 3 of the drawings. The first remote contact 34 and the second remote contact 36 are positioned within the opening 38 and electrically communicate with the first contact 24 and the second contact 26 respectively when the carrier member 20 is positioned within the opening 38 as best illustrated in FIG. 4 of the drawings. If the carrier member 20 is comprised of a card-type structure, the opening 38 is preferably comprised of slot-type structure. An opening 38 within the remote unit 30 is not required if the remote contacts 34, 36 are attached to an external portion of the remote unit 30.

D. Carrier Member.

The carrier member 20 may be comprised of any conventional device where valuable data is to be stored and selectively transmitted from (e.g. card, credit card, debit card, identification card, electronic key fob, mobile phone, electronic device, PDA etc.). The carrier member 20 is preferably comprised of a flat and rectangular structure forming a card-type structure as illustrated in FIG. 1 of the drawings. The carrier member 20 may also be comprised of various other shapes, structures and sizes (e.g. round, square, oval, etc.).

Figure 5:
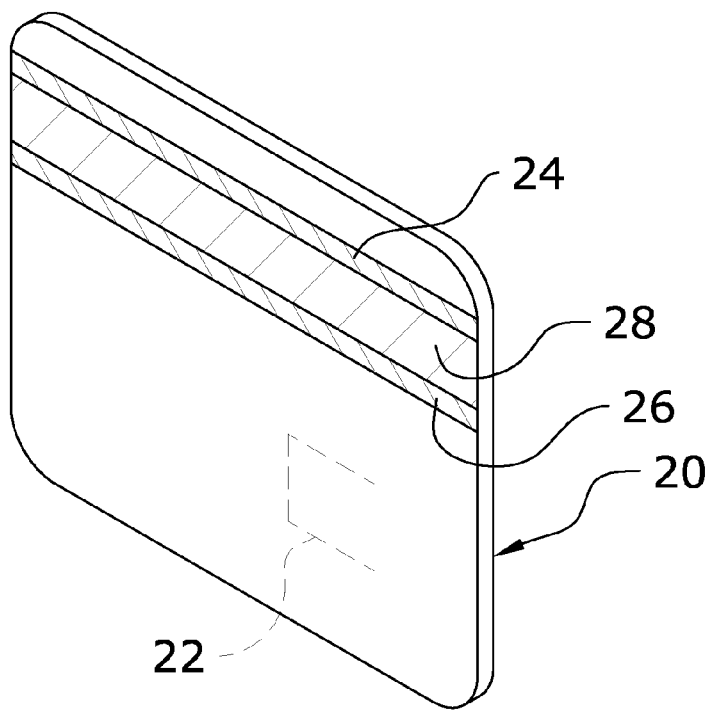
FIG. 5 is an upper perspective view of a carrier member illustrating a pair of elongated contacts.

The carrier member 20 includes an RFID chip 22 as illustrated in FIG. 5 of the drawings. While the RFID chip 22 may have an antenna, it is preferable that the RFID chip 22 does not include an antenna to prevent unauthorized access of RFID chip 22. The RFID chip 22 is preferably comprised of a passive or semi-passive RFID system, however the RFID chip 22 may be comprised of an active RFID system. The RFID chip 22 may also be comprised of a near field communications (NFC) system utilized in mobile electronic devices such as cellphones. The RFID chip 22 may be comprised of any wireless chip technology capable of transmitting and receiving data wirelessly.

The carrier member 20 includes at least one contact 24 in electrical communication with the RFID chip 22. The RFID chip 22 is adapted so that the RFID chip 22 is not activated or capable of transmitting data unless the at least one contact 24 is physically connected to the at least one remote contact 34.

It is preferable that the carrier member 20 include a first contact 24 and a second contact 26 as illustrated in FIGS. 1, 3b, 3c, 4 and 5 of the drawings. The first contact 24 is adapted to physically contact the first remote contact 34 and wherein the second contact 26 is adapted to physically contact the second remote contact 36 when the carrier member 20 is positioned in a desired location on the remote unit 30. When the first contact 24 is in communication with the first remote contact 34 and when the second contact 26 is in communication with the second remote contact 36, an electrical circuit is formed with the remote antenna 32 that allows for the reception and transmission of radio waves as is known in the RFID industry.

As best illustrated in FIGS. 1 and 5 of the drawings, the first contact 24 and the second contact 26 are preferably comprised of elongated contact structures that extend along the length of the carrier member 20 so that when the carrier member 20 is positioned within the opening 38 the user does not have to expend significant effort aligning the contacts 24, 26 with the remote contacts 34, 36.

Figure 6:
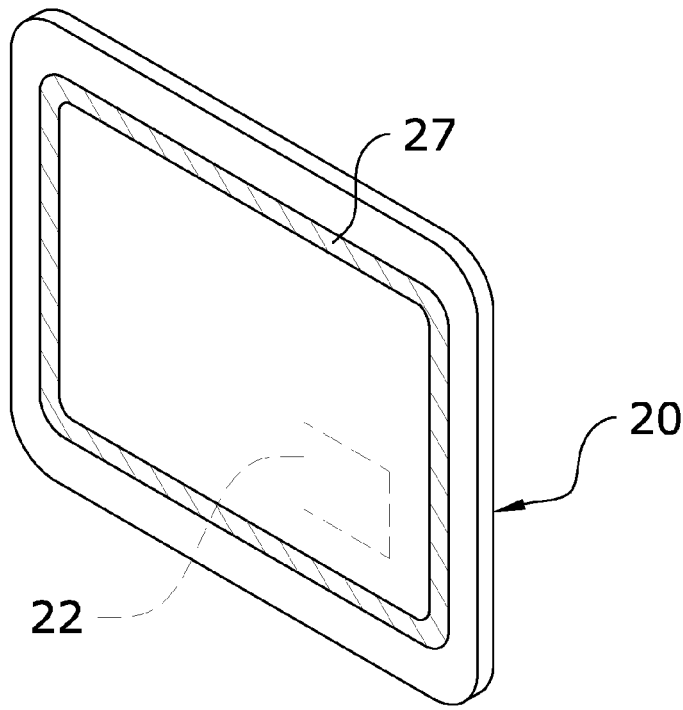
FIG. 6 is an upper perspective view of the carrier member illustrating an alternative embodiment with a single perimeter contact.

The first contact 24 and the second contact 26 are preferably substantially parallel to one another and are positioned on opposite sides of a magnetic strip 28 attached to the carrier member 20 as further shown in FIGS. 1 and 5 of the drawings. Alternatively, the at least one contact is comprised of a perimeter contact 27 that extends around a surface of the carrier member 20 near a perimeter of the carrier member 20 as illustrated in FIG. 6 of the drawings. The first contact 24 and the second contact 26 are preferably on the same side of the carrier member 20, however, the contacts 24, 26 may be positioned on opposite sides of the carrier member 20.

E. Operation of Preferred Embodiment.

In use, the RFID chip 22 of the carrier member 20 preferably does not include its own antenna and hence not capable of receiving radio waves or transmitting radio waves. The remote antenna 32 of the remote unit 30 becomes the antenna for the RFID chip 22 when the contact 24, 26 are physically connected to the remote contacts 34, 36 as illustrated in FIGS. 4 and 3c of the drawings. The radio waves transmitted by the RFID reader 40 are received by the remote antenna 32 and then electrically communicated to the RFID chip 22 when the remote antenna 32 is electrically connected to the RFID chip 22. The radio waves received by the remote antenna 32 are used to provide electrical power to the RFID chip 22 and thereby activates the RFID chip 22. The RFID chip 22 transmits radio waves including data (e.g. credit card data, personal data, etc.) from the remote antenna 32 for reading by the RFID reader 40 when the contacts 24, 26 are electrically connected to the remote contacts 34, 36 of the remote unit 30 as shown in FIGS. 2, 3c and 4 of the drawings. After the data has been transmitted to the RFID reader 40, the user then removes the carrier member 20 from the remote unit 30 thereby deactivating the RFID chip 22 within the carrier member 20 making the RFID chip 22 impossible to access by an unauthorized device or individual.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A remote antenna system, comprising:
   a remote unit, wherein said remote unit includes a remote antenna and at least one remote contact in communication with said remote antenna; and
   a carrier member, wherein said carrier member includes an RFID chip and at least one contact in communication with said RFID chip, wherein said RFID chip is adapted so that said RFID chip is not activated unless said at least one contact is physically connected to said at least one remote contact;
   wherein said RFID chip does not include an antenna;
   wherein when said at least one contact is in communication with said at least one remote contact, a direct connection is formed between the remote contact and the remote antenna.

2. The remote antenna system of claim 1, wherein said remote antenna of said remote unit becomes an antenna for said RFID chip when said at least one contact is physically connected to said at least one remote contact.

3. The remote antenna system of claim 2, wherein radio waves received by said remote antenna are communicated to said RFID chip when said at least one contact is connected to said at least one remote contact, and wherein said RFID chip transmits radio waves including data from said remote antenna for reading by an RFID reader when said at least one contact is connected to said at least one remote contact.

4. The remote antenna system of claim 1, wherein said at least one contact is comprised of a first contact and a second contact, wherein said at least one remote contact is comprised of a first remote contact and a second remote contact, wherein said first contact is adapted to physically contact said first remote contact and wherein said second contact is adapted to physically contact said second remote contact when said carrier member is positioned in a desired location on said remote unit.

5. The remote antenna system of claim 4, wherein when said first contact is in communication with said first remote contact and when said second contact is in communication with said second remote contact, an electrical circuit is formed with said remote antenna.

6. The remote antenna system of claim 4, wherein said remote unit includes an opening adapted to receive said carrier member, wherein said first remote contact and said second remote contact are positioned within said opening.

7. The remote antenna system of claim 4, wherein said first contact and said second contact are comprised of elongated contact structures.

8. The remote antenna system of claim 7, wherein said first contact and said second contact are substantially parallel to one another and are positioned on opposite sides of a magnetic strip attached to said carrier member.

9. The remote antenna system of claim 1, wherein said at least one contact is comprised of a perimeter contact that extends around a surface of said carrier member near a perimeter of said carrier member.

10. A remote antenna system, comprising:
    an RFID reader, wherein said RFID reader includes a reader antenna;
    a remote unit, wherein said remote unit includes a remote antenna and at least one remote contact in communication with said remote antenna, wherein said remote antenna is in communication with said reader antenna; and
    a carrier member, wherein said carrier member includes an RFID chip and at least one contact in communication with said RFID chip, wherein said RFID chip is adapted so that said RFID chip is not activated unless said at least one contact is physically connected to said at least one remote contact;
    wherein said RFID chip does not include an antenna;
    wherein when said at least one contact is in communication with said at least one remote contact, a direct connection is formed between the remote contact and the remote antenna.

11. The remote antenna system of claim 10, wherein said remote antenna of said remote unit becomes an antenna for said RFID chip when said at least one contact is physically connected to said at least one remote contact.

12. The remote antenna system of claim 11, wherein radio waves received by said remote antenna are communicated to said RFID chip when said at least one contact is connected to said at least one remote contact, and wherein said RFID chip transmits radio waves including data from said remote antenna for reading by said RFID reader when said at least one contact is connected to said at least one remote contact.

13. The remote antenna system of claim 10, wherein said at least one contact is comprised of a first contact and a second contact, wherein said at least one remote contact is comprised of a first remote contact and a second remote contact, wherein said first contact is adapted to physically contact said first remote contact and wherein said second contact is adapted to physically contact said second remote contact when said carrier member is positioned in a desired location on said remote unit.

14. The remote antenna system of claim 13, wherein when said first contact is in communication with said first remote contact and when said second contact is in communication with said second remote contact, an electrical circuit is formed with said remote antenna.

15. The remote antenna system of claim 13, wherein said remote unit includes an opening adapted to receive said carrier member, wherein said first remote contact and said second remote contact are positioned within said opening.

16. The remote antenna system of claim 13, wherein said first contact and said second contact are comprised of elongated contact structures.

17. The remote antenna system of claim 16, wherein said first contact and said second contact are substantially parallel to one another and are positioned on opposite sides of a magnetic strip attached to said carrier member.

18. A remote antenna system, comprising:
- an RFID reader, wherein said RFID reader includes a reader antenna;
- a remote unit attached to said RFID reader, wherein said remote unit includes a remote antenna and at least one remote contact in communication with said remote antenna, wherein said remote antenna is in communication with said reader antenna; and
- a carrier member, wherein said carrier member includes an RFID chip and at least one contact in communication with said RFID chip, wherein said RFID chip is adapted so that said RFID chip is not activated unless said at least one contact is physically connected to said at least one remote contact;
- wherein said RFID chip does not include an antenna;
- wherein said remote antenna of said remote unit becomes an antenna for said RFID chip when said at least one contact is physically connected to said at least one remote contact;
- wherein radio waves received by said remote antenna are communicated to said RFID chip when said at least one contact is connected to said at least one remote contact, and wherein said RFID chip transmits radio waves including data from said remote antenna for reading by said RFID reader when said at least one contact is connected to said at least one remote contact;
- wherein said at least one contact is comprised of a first contact and a second contact, wherein said at least one remote contact is comprised of a first remote contact and a second remote contact, wherein said first contact is adapted to physically contact said first remote contact and wherein said second contact is adapted to physically contact said second remote contact when said carrier member is positioned in a desired location on said remote unit;
- wherein when said first contact is in communication with said first remote contact and when said second contact is in communication with said second remote contact, a direct connection is formed between both the remote contacts and the remote antenna;
- wherein said remote unit includes an opening adapted to receive said carrier member, wherein said first remote contact and said second remote contact are positioned within said opening.

* * * * *